Aug. 25, 1936.  H. H. WILLIS  2,052,153
SPHEROMETER
Filed Dec. 29, 1931  3 Sheets-Sheet 1

INVENTOR
Horace H. Willis.
BY Herbert H. Thompson
his ATTORNEY.

Aug. 25, 1936.                H. H. WILLIS                2,052,153
                                SPHEROMETER
                           Filed Dec. 29, 1931          3 Sheets-Sheet 2
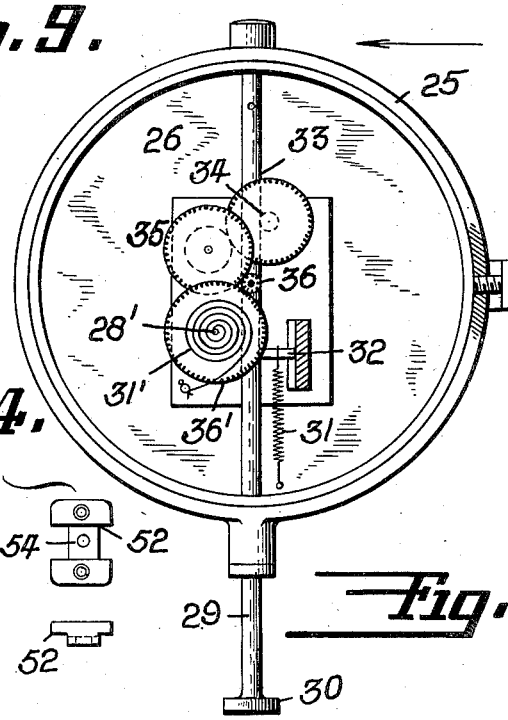
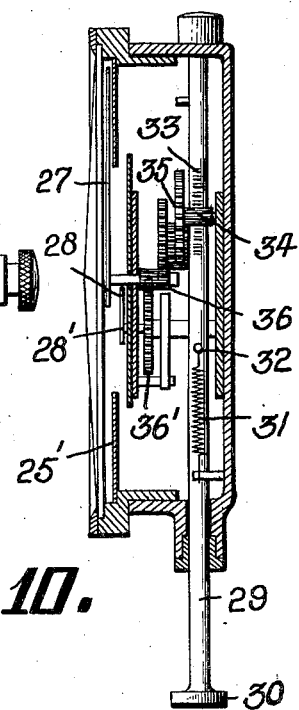
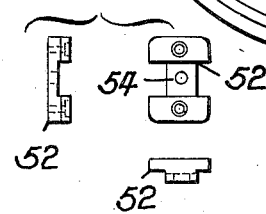
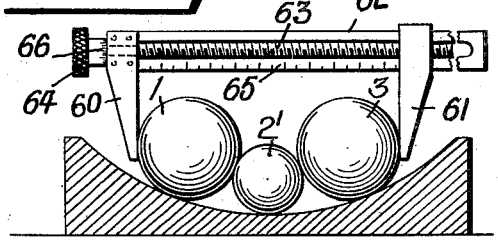
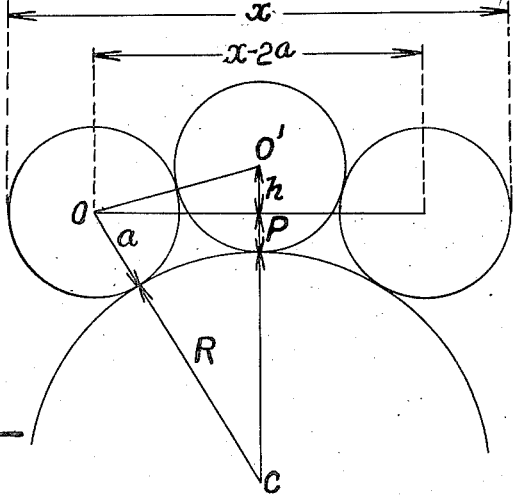
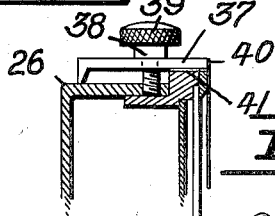
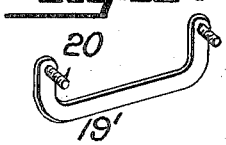
INVENTOR
Horace H. Willis.
BY
Herbert H. Thompson
his ATTORNEY.

Aug. 25, 1936.　　　H. H. WILLIS　　　2,052,153
SPHEROMETER
Filed Dec. 29, 1931　　　3 Sheets-Sheet 3
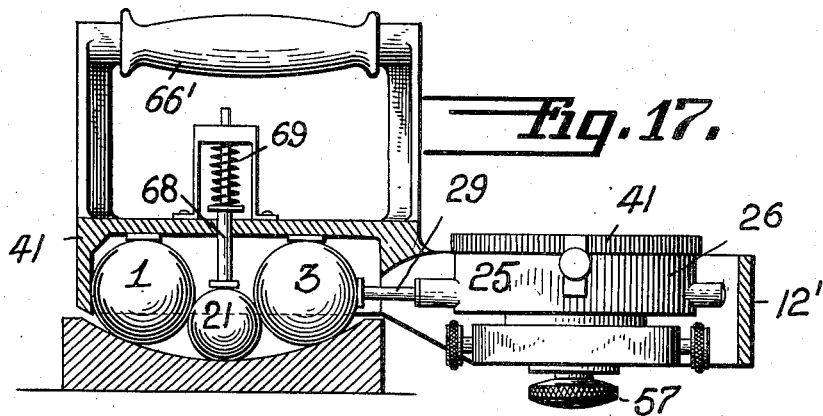
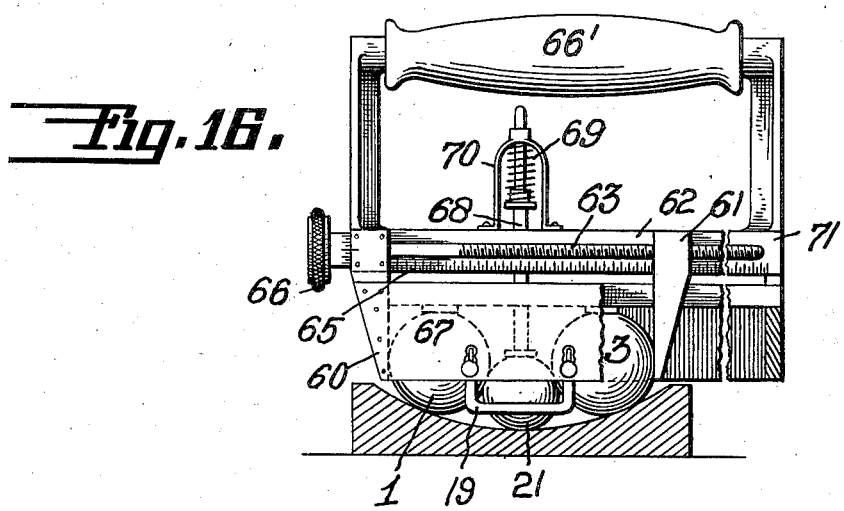
INVENTOR
Horace H. Willis
BY Herbert H. Thompson
HIS ATTORNEY.

Patented Aug. 25, 1936

2,052,153

UNITED STATES PATENT OFFICE 2,052,153

SPHEROMETER

Horace H. Willis, Pelham, N. Y., assignor to Sperry Gyroscope Company, Inc., Brooklyn, N. Y., a corporation of New York Application December 29, 1931, Serial No. 583,622

14 Claims. (Cl. 33—172)

This invention relates to spherometers of the type which employs a plurality of balls adapted to be brought into contact with the surface, the curvature of which is to be measured. Usually in such instruments at least three outer balls are employed together with a vertically adjustable middle ball, the balls being rigidly held against lateral movement and spaced apart. The precision of the latter type of instrument is limited to an extent determined by the accuracy of spacing of the four balls, the certainty of contact of the four balls with the surface to be measured and the precision of the indicating apparatus employed to determine the vertical displacement of the central ball. In addition it should be noted that this type of instrument measures the radius of a sphere determined by the four points of contact of the balls and the work surface.

According to my invention I propose to greatly simplify and at the same time increase the flexibility of such instruments by employing a less number of balls, preferably three arranged in a row and touching. Means are provided to constrain the motion of the balls so that whatever their possible position, the plane determined by their centers remains fixed with respect to the instrument. Also, to permit the raising and lowering of the middle ball and at the same time keep the balls touching, I provide a means for permitting lateral motion, i. e., variation in the distance between the centers of the balls. By employing touching balls, the usual complicated formula for deriving the radius of curvature of a spherical or other curved surface is greatly simplified and may be determined by either the vertical displacement of the center or middle ball with respect to the outer balls or the lateral movement or separation of the outer balls. By my invention the value of the radius of curvature of the surface to be measured is determined directly in terms of the known radii of the three balls and either the perpendicular displacement of the center of the middle ball with respect to a line through the centers of the two outer balls or the displacement of the two outer balls along the line joining their centers.

Another object of the invention is to improve and simplify this type of spherometer so that great accuracy is secured without complication. By my invention I provide an instrument which measures the radius of a circle determined by the three points of contact between the balls and the work surface. In the event it is desired to measure the radius of a spherical surface with the instrument the necessary and sufficient criterion that the radius of the measured circle equal the radius of the sphere is that the three points of contact lie in the plane determined by the centers of the balls. In other words, means are provided whereby radii of "great circles" can be measured. It is to be noted that this provides an accurate method for determining departures from sphericity of a given unknown surface. In addition the invention provides a means for measuring the curvature as well as the space rate of change of curvature of any surface to a precision limited only by the conditions of the problem in hand. Thus my device may be used to measure the curvature of any mathematically curved surface by measuring the same at a number of points to obtain the space rate of change of curvature from which the character or equation for the curve may be obtained. Therefore, my invention possesses a distinct advantage over prior types of spherometers which are useless except on surfaces having uniform radii of curvature in all planes.

Referring to the drawings showing several preferred forms of the invention,

Fig. 9 is a front elevation of the interior of the registering mechanism, the cover and dials being removed.

Fig. 10 is a vertical section of the same looking in the direction of the arrow in Fig. 9.

Fig. 11 is a diagrammatic view showing another form of my invention containing two modifications from the form shown in the other figures.

Fig. 12 is a diagram showing the derivation of the formula for computing the radius of curvature.

Fig. 13 is a detail of the locking mechanism for setting the dials.

Fig. 14 is three views of a small locking plate used in the device.

Fig. 15 is a perspective view of half of the limit cage for the center ball.

Fig. 16 is a side elevation, partly in section, showing in more detail the form of the invention illustrated diagrammatically in Fig. 11.

Fig. 17 is a corresponding view showing still another form of constructing the general form of the invention shown in Fig. 11.

Figure 1:
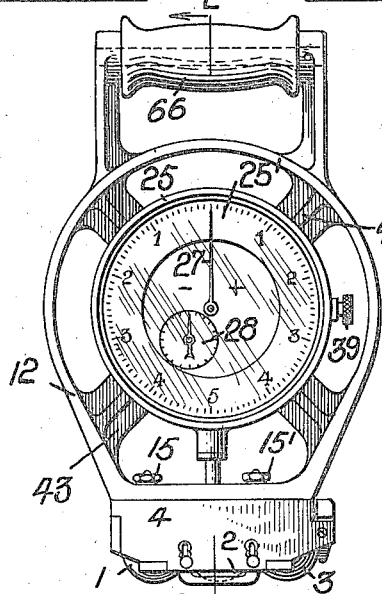
Fig. 1 is a front elevation of my spherometer.

My apparatus consists essentially of a plurality of touching balls 1, 2 and 3 arranged in line. Said balls are preferably very accurately ground to known diameters (preferably all three are equal) and are mounted in a frame 4 with limited play. For simplicity in working with the instrument it is desirable that either the radius or diameter of each of the balls has the value unity. Preferably the end balls 1 and 3 are fixed against up and down movement, each being mounted in a cage 5 and 6 respectively formed in the ends of the housing 4 by end blocks 7 and 8 and by wedge-shaped bottom pieces 9, 10 and 9', 10' which rest against the bottom side portions of each ball and prevent the same from dropping downwardly, each ball resting at its top against a boss 11—11'. The member 4 is secured to the main frame work 12 by two pairs of machine screws 13, 13' and 14, 14' which project through apertures in the bottom of the frame 12 and are held in place by nuts 15 and 15'. Ball 1 may have no lateral movement but ball 3 is provided with a limited lateral movement being yieldingly pressed against the intermediate ball 2 by the spring pressed end block 8 pivoted on rod 17 and having the toe 16 thereof yieldingly held against the ball by compression springs 18, 18'. The middle ball 2 is mounted in an open cage 19 for limited up and down movement. The cage is shown as comprising a pair of U-shaped pieces 19', each having thereon laterally extending threaded pins 20. The cage may be locked in any one of a plurality of positions by inserting said pins through any pair of a plurality of pairs of apertures 21, 22 and 23 on each side of the cage, nuts 20' being used to lock them in position. The cage may, therefore, be placed at three different heights so as to increase the range of possible movement of the central ball for convex, concave, or nearly flat surfaces.

Figure 7:
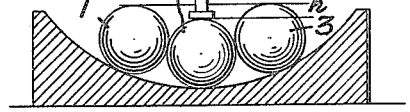
Fig. 7 is a diagram illustrating the use of the device in obtaining the radius of curvature of a concave surface.
Figure 4:
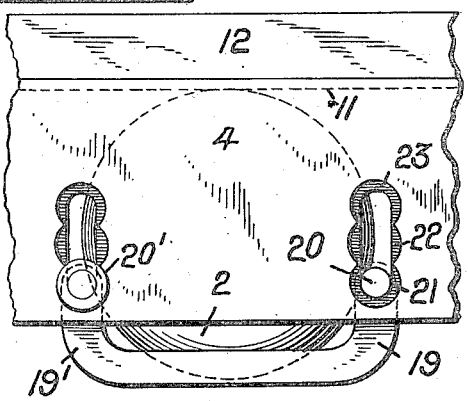
Fig. 4 is an enlarged view of the mounting for the central ball.
Figure 8:
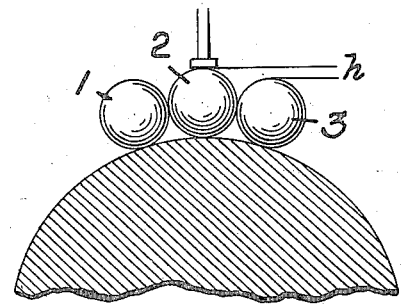
Fig. 8 is a similar view showing how the device is used on a sphere or convex surface.

According to the preferred form of my invention, the radius of curvature is measured by measuring the difference in elevation of the middle ball as compared to the two end balls, that is, the distance marked $h$ in Figs. 7, 8 and 12. This distance may be considered either plus or minus according to whether a convex or concave surface is being measured. A convenient method of accurately measuring the height of the middle ball is to mount within the frame 12 an accurate micrometer gauge 25. As shown said gauge comprises a box portion 26 containing the multiplying gearing for actuating the main or micrometer index 27 and the coarse index or revolution counter 28 in accordance with the position of the movable rod 29. Said rod has a foot 30 thereon which rests on top of the middle ball 2 and is yieldingly pressed downwardly thereon by a spring 31 anchored to the casing and at the upper end to a small pin 32 extending laterally from said rod. Rack teeth 33 are cut on the rod which mesh with a piston 24 which is the first of a series of multiplying gears 35 which finally actuate small pinion 36 on the shaft of the index 27. A larger gear 36' meshes therewith on the shaft 28' on which pointer 28 is mounted. A light coil spring 31' is also secured to said shaft so as to take up any back lash that may be present in the train of gearing.

The main dial 25' of the instrument is adjustably mounted thereon so that it may be set in any desired position to read zero with respect to the index 27, the dial being graduated both clockwise and counter-clockwise for plus and minus measurements. The dial may be locked in place by a clamp 37 which is tightened and loosened at will by means of a set screw 38 having a knurled head 39, the clamp bearing at its upper end 40 against the knurled periphery 41 of the dial face (see Fig. 13).

The entire indicator box 26 is adjustably clamped to the spider arms 43 of the framework 12. The spider arms meet at their center to form a central hub 46, having a vertical slot 49 therein shown with enlarged ends.

Slidably mounted in said slot 49 is a block 50 secured to the back of the indicator 26. Said block is vertically adjustable in said slot by means of set screws 51—51' threaded through the ends of the central hub 46. By this means the gauge may be accurately positioned in the framework 12. To lock it in position there is provided a small I-shaped plate 52 which is clamped in place on the block by set screws 53. Said plate 52 has a central aperture 54 through which projects a threaded stem 55 on the block 50. Said plate overlies at each end the central block or hub 46 and its middle portion is cut away to receive a locking plate 56 (Fig. 14). Said plate also has a central aperture through which the stem 55 projects. It will readily be seen, therefore, that by screwing down on the thumb nut 57 threaded on the stem 55 that the parts will be rigidly clamped in place after the height of the instrument is properly adjusted.

Reference is now had to Fig. 12 which shows the derivation of the formula for computing the radius of curvature of a surface in terms of either the height "$h$" of the middle ball or the distance "$x$" between the outer surface of the outer balls when the five points of contact made by the balls with each other and the work surface and the three centers of the balls are coplanar.

Considering first the right triangle COP, one may write the equation:

(1) $\quad (R+a)^2 = [R+a-h]^2 + \dfrac{(x-2a)^2}{4}$ where $R$ is the desired radius of curvature, $a$, the radius of each of the balls, $h$ is the perpendicular distance from the center of the middle ball to the line joining the centers of the two outer balls, and $x$ is the distance between the outer faces of the two outer balls along a line joining their centers.

But considering now the right triangle OO'P, one may write:

(2) $\quad \dfrac{(x-2a)^2}{4} = 4a^2 - h^2$

Substituting this value for $$\dfrac{(x-2a)^2}{4}$$

to eliminate $x$, we have (3) $\quad (R+a)^2 = [R+a-h]^2 + 4a^2 - h^2$ (4) $\quad R = \dfrac{2a^2 - ah}{h}$ Or in terms of diameters instead of radii where D equals the diameter of the sphere being measured and $d$ the diameter of the measuring balls:

(5) $$D=d\left(\frac{d-h}{h}\right)$$

For a concave surface the equation reduces to (6) $$D=d\left(\frac{d+h}{h}\right)$$

If $d$ is chosen as unity then these equations may be written:

(5') $$\frac{D=1-h}{h}=\frac{1}{h}-1$$

for convex surfaces, and (6') $$D=\frac{1+h}{h} \text{ or } \frac{1}{h}+1$$

for concave surfaces.

It is, of course, obvious that if desired the dial 25' may be graduated to read directly the radius of curvature being measured although in this case the graduations would not be uniform.

It will be noted that $h$ has been taken as positive in the direction upward from the line joining the centers of the two outer balls in Fig. 12 and $R$ as positive when the center of curvature lies below the three points of contact. This necessitates a negative value for $h$ and implies the negative sign for $D$ in Equations (5) and (5') for the case of a concave surface. The invention provides a means for attaining the coplanar case for which (5) is derived by simply rocking the instrument in a plane perpendicular to the line joining the centers of the two outer balls until a maximum $h$ is noted.

Fig. 11 shows a simple method of measuring the lateral displacement of the outside balls instead of the up and down movement of the middle ball. In this case $x$ in the above equations is being measured instead of $h$.

The working equation of the instrument for this case can be similarly derived from (1) and (2) by the elimination of $h$.

It is clear that any combination of three balls having differing radii can be used, the combination desired depending upon the particular problem in hand. A particular case is one in which the middle ball has a radius $a'$, which is smaller than the radius $a$ of the two outer balls (Fig. 11). The advantage of this arrangement lies in the tendency to hold the middle ball against the work rather than to push it away from the work as is the case under certain circumstances with three equal balls. In this case Equation (4) becomes (7) $$R=\frac{a'^2+aa'-a'h}{a-a'+h}$$

It is to be noted that in the case of the three equal balls, the $h$ in Figs. 7 and 8 is equal to $h$ in Equations (4) and (5). However, in case the middle ball has a radius $a'<a$ the measurable quantity, namely the rise of the top surface of the middle ball above a line across the tops of the outer balls, is not equal to $h$ of Equation (6) but $h'$ where $$h=h'+a-a'$$

bearing in mind the convention that $h'$ is positive when the displacement is above the line across the tops of the two outer balls.

In the apparatus according to Figs. 11 and 16 the outside balls are again marked 1 and 3 and the middle ball 2'. The distance $x$ is shown as measured by a pair of parallel jaws 60—61, the former being fixed to a graduated bar 62 and the latter threaded on the screw 63 journalled in the bar. It will readily be seen that by turning the knurled head 64 the jaw 61 may be moved against the ball 3 so as to measure the distance $x$ on the scale 65 and the micrometer scale 66 on the shaft 63. The three balls, as before, may be supported in a cage 67, of which the fixed jaw 60 may form one end, the movable jaw being slidably mounted between the side walls of the cage. The center ball 2' is shown as yieldingly pressed downwardly into engagement with the work by means of a plunger 68, against which spring 69 bears, said spring and plunger being supported in a bracket 70 secured to the top of the framework 71 which supports the cage. A handle 66' may be provided for pressing the ball into engagement with the work.

Figure 2:
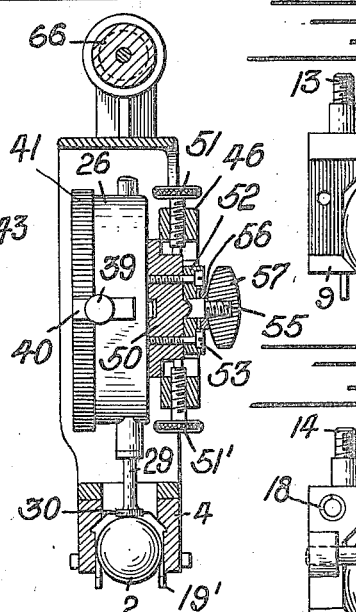
Fig. 2 is a vertical section taken on line 2—2 of Fig. 1.
Figure 5:
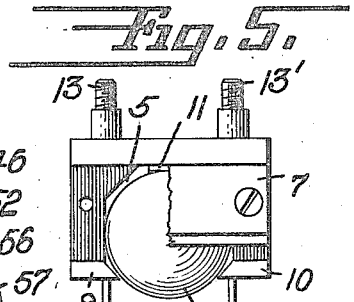
Fig. 5 is a front elevation with parts broken away of the holder for one of the end balls.
Figure 6:
Fig. 6 is a similar view of the holder for the other end ball, which in this case is the adjustable ball.
Figure 3:
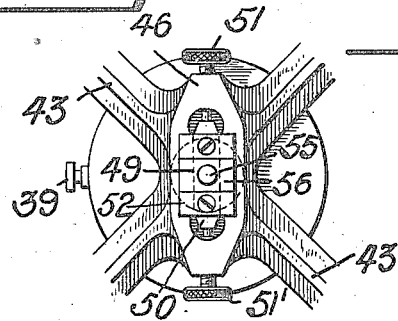
Fig. 3 is a rear elevation of the center portion only of the registering mechanism.

The form of measuring gauge shown in Figs. 1 and 2 may also be employed for measuring the lateral separation of the balls. Such a construction is shown in Fig. 17, in which the balls are supported in a cage 4' and the lateral movement of the end ball 3 is measured by a gauge 25 mounted in a framework 12' secured to the cage at one end. The gauge 25 may be in all respects the same as the gauge in Fig. 1, except that it is placed horizontal and read from the top.

Assuming the gauge of Fig. 1 to be correctly mounted in the frame 12, the apparatus is used by grasping the handle 66 in the hand and pressing the balls down against the surface to be measured. The gauge 19 is adjusted in the proper holes so as not to interfere with the vertical movements of the middle ball 2. The handle is then rocked back and forth in order that the operator may make sure that the correct reading is obtained and the gauge is read when the maximum curvature is shown.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A spherometer comprising a plurality of touching balls, means for mounting the same to permit lateral separation of the outer balls and up and down movement of a middle ball so that all balls may rest on the work, and micrometer means for measuring the relative movement of said balls.

2. A spherometer comprising a plurality of touching balls, means for mounting the same to permit lateral separation of the outer balls and up and down movement of a middle ball so that all balls may rest on the work, and micrometer means for measuring the vertical movements of said middle ball.

3. A spherometer comprising a plurality of touching balls, means for mounting the same to permit lateral separation of the outer balls and up and down movement of a middle ball so that all balls may rest on the work, and micrometer means for measuring the lateral movements of said outer balls.

4. A spherometer comprising a cage or housing for adjustably supporting three balls in a row for conforming engagement with the work, yielding means for pressing the outer balls against the middle ball, yielding means for pressing the middle ball downwardly against the work, and a gauge for measuring the up and down movement of the middle ball.

5. A spherometer comprising a cage or housing for adjustably supporting three balls in a row, yielding means for pressing the outer balls against the middle ball, a vertical rod engaging the top of the middle ball, resilient means holding said rod against said ball, and a micrometer means for indicating the vertical movements of said rod.

6. A spherometer comprising three balls adapted to be brought into contact with the measured surface and having five points of contact with the work and with one another lying in the same plane, means for supporting the end balls for limited lateral movement and the middle ball for vertical movement and means for measuring the variations in vertical movement of the center ball with respect to the other two.

7. A spherometer comprising a cage or housing for adjustably supporting three balls of equal diameter in a row for conforming engagement with the work, yielding means for pressing the outer balls against the middle ball, yielding means for pressing the middle ball downwardly against the work, and a gauge for measuring the up and down movement of the middle ball.

8. A spherometer comprising three balls adapted to be brought into contact with the measured surface and having five points of contact with the work and with one another lying in the same plane, means for supporting the end balls for limited lateral movement and the middle ball for vertical movement the middle ball being smaller than the other two, and means for measuring the variations in vertical movement of the center ball with respect to the other two.

9. A spherometer comprising a cage or housing for adjustably supporting three balls in a row, yielding means for pressing the outer balls against the middle ball, a vertical rod engaging the top of the middle ball, resilient means holding said rod against said ball, a micrometer gauge for measuring the movements of said rod, a frame secured to said cage, and means for adjustably mounting said gauge in said frame.

10. A spherometer comprising a cage or housing for adjustably supporting three balls in a row, yielding means for pressing the outer balls against the middle ball, a vertical rod engaging the top of the middle ball, resilient means holding said rod against said ball, a micrometer gauge for measuring the movements of said rod, a frame secured to said cage, means for adjustably mounting said gauge in said frame, and means whereby the zero point on the gauge may be adjusted.

11. A spherometer comprising three balls adapted to be brought into contact with the measured surface and having five points of contact with the work and with one another lying in the same plane, a cage for supporting the end balls for limited lateral movement and the middle ball for vertical movement, means for yieldingly pressing said middle ball in engagement with the measured surface and means for measuring the variations in lateral position or spacing of the outer balls.

12. A spherometer comprising a plurality of linearly arranged touching balls of equal diameter adapted to rest on the work, a cage for fixedly supporting one end ball and the other end ball for limited lateral movement only and a middle ball for vertical movement and means for measuring relative up and down movement of a middle ball with respect to the other balls for measuring the radius of curvature of the work in terms of the diameter of the said balls.

13. A spherometer comprising a plurality of touching balls of equal diameter adapted to rest on the work, a cage for fixedly supporting one end ball and the other end ball for limited lateral movement only and a middle ball for vertical movement, means for yieldingly pressing the middle ball against the measured surface and means for measuring lateral separation of the outer balls for measuring the radius of curvature of the work in terms of the diameter of the said balls.

14. A spherometer comprising a pair of outer balls of equal diameter, a middle ball of lesser diameter, a cage for supporting the end balls for limited lateral movement and the middle ball for vertical movement all of said balls being adapted to rest on the work and to touch the adjacent ball, and means for measuring relative movement of said balls for measuring the radius of curvature of the work in terms of the diameters of the said balls.

HORACE H. WILLIS.